United States Patent

Noack et al.

[11] 3,721,168
[45] March 20, 1973

[54] PHOTOGRAPHIC CAMERA

[75] Inventors: Rolf Noack; Heinz Schulze, both of Dresden, Germany

[73] Assignee: VEB Pentacon, Kamera-und Kinowerke, Dresden, Germany

[22] Filed: Aug. 2, 1971

[21] Appl. No.: 167,941

[52] U.S. Cl. ...............................................95/10 C
[51] Int. Cl. .................................................G03b 7/02
[58] Field of Search............................95/10 B, 10 C

[56] References Cited

UNITED STATES PATENTS 3,470,805  10/1969  Suzuki et al. ..........................95/10 X
3,545,351  12/1970  Hahn..........................................95/10

Primary Examiner—Samuel S. Matthews
Assistant Examiner—Michael L. Gellner
Attorney—William A. Drucker

[57] ABSTRACT

The photographic camera is provided with a photoelectric exposure-measuring apparatus which functions in dependance upon the light passing through the objective lens. The measurement may be made with the diaphragm fully open or stopped down to an aperture at which an exposure is to be made. A change-over switch is provided by which either the variable resistor, which is variable together with the diaphragm-setting member in the case of open aperture measurement, or a substitute resistor lying in parallel therewith in the case of working aperture measurement, is connectible into the measurement circuit. For the optional measurement either with open aperture or with working aperture, measuring key means are provided coupled with the change-over switch so that on selection of open aperture measurement the variable resistor is connectible into the measurement circuit and on selection of working aperture measurement the substitute resistor is connectible into the measurement circuit.

5 Claims, 4 Drawing Figures

PHOTOGRAPHIC CAMERA

BACKGROUND TO THE INVENTION

The invention relates to a photographic camera having an apparatus for photo-electric exposure-measurement through the taking lens according to choice with fully open aperture or working aperture, while a change-over switch is provided by which either the variable resistor, which is variable together with the diaphragm setting member is connectible into the measurement circuit in the case of open aperture measurement or a substitute resistor lying parallel thereto is connectible into the measurement circuit in the case of working aperture measurement.

Photographic cameras of this kind are suitable for carrying out exposure measurement either with open aperture (bright measurement) or with working aperture set to the respective diaphragm value (dark measurement). For the execution of an exposure measurement in the case of open aperture an electric resistor lying in the measurement circuit is variable with the diaphragm stop setting member, while in the case of the execution of an exposure measurement with working aperture the respective diaphragm aperture directly influences the measurement result. For the purpose of carrying out an exposure measurement — with open aperture or working aperture according to choice — it is known to provide a change-over switch on actuation of which the resistor variable with the diaphragm stop setting member is connectible into or disconnectible from the measurement circuit. This change-over switch is to be actuated before the execution of an exposure measurement. This arrangement requires, irrespective of the actuation of a measurement key, the additional operation of the change-over switch and the constant observation of its switch position, so that an undesired incorrect measurement result is not achieved.

The invention has for purpose the improvement of the operation of a camera of the above-stated kind and has for its problem an operating device which renders possible the optional exposure measurement with open aperture or working aperture.

SUMMARY OF THE INVENTION

According to the invention there is provided in a photographic camera having a housing, a diaphragm aperture in the housing and a diaphragm aperture setting member positioned on the housing, the provision of an exposure measuring circuit including a photo-electric measuring device mounted on the housing in the path of light passing through the diaphragm aperture, a first resistor connected with the photo-electric measuring device and variable by adjustment of the diaphragm setting member, a second resistor connected with the photo-electric measuring device, a change over switch connected in circuit with the first and second resistors and the photo-electric measuring device and measuring key means positioned on the housing and adapted to select open or working aperture exposure measurement whereby with the change over switch in its first position for the purpose of open aperture measurement the first resistor is connected into the measuring circuit whereas with the change over switch in its second position for the purpose of working aperture measurement the second resistor is connected into the measuring circuit in place of the first resistor.

With a camera having a preselector diaphragm having diaphragm blades closeable to an aperture presettable by the diaphragm aperture setting member, spring means may be provided adapted to urge the diaphragm blades into the preset position when the measuring key means selects working aperture exposure measurement.

BRIEF DESCRIPTION OF DRAWINGS

The invention is explained by reference to an illustrated and described example of embodiment.

DESCRIPTION OF PREFERRED EMBODIMENT

Figure 1:
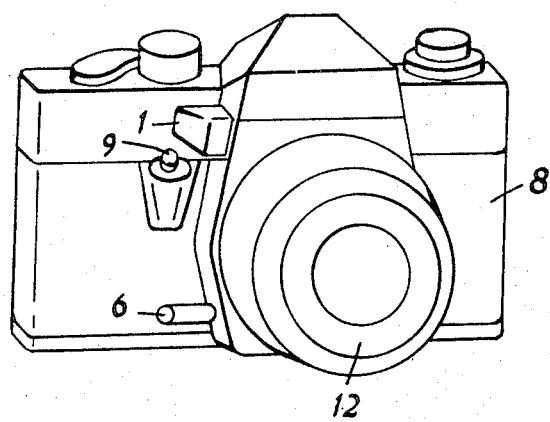
FIG. 1 shows the arrangement of the measurement keys on the camera body.

On the housing 8 of a monocular mirror reflex camera (see FIG. 1) there are arranged, as well as the camera release 9, the measurement key 1 for the execution of an exposure measurement with partially closed diaphragm (working aperture) and the measurement key 6 for the execution of an exposure measurement with completely opened diaphragm (open aperture).

A pre-selector diaphragm is installed in the picture-taking lens 12. The diaphragm stop setting member 13 (see FIG. 2) possesses a stop 14 and is adjustable in relation to the setting mark 15. The diaphragm blades 16 mounted about stationary pins 31 are geared with the diaphragm setting member 17 which carries the stop nose 18. The return spring 19 seeks always to move the diaphragm setting member 17 into the position corresponding to the open position of the diaphragm blades 16. The photo-electric cell 20 is arranged behind the diaphragm opening in the camera-side ray path of the picture-taking lens 12.

The exposure-measuring apparatus is formed as bridge circuit, as regards its electric part. The battery 10 delivers the feed voltage; the galvanometer 11 lies in the diagonal branch of the measurement bridge. The bridge resistors 21 and 22 are arranged in mutually adjacent branches of the bridge. The resistors 23 and 24, connected in cascade as exponential voltage dividers, lie in the bridge branch adjacent to the photo-electric cell 20. The slider 25 of the resistor 23 is coupled with a time-setting member (not shown), while the slider 26 is geared with the diaphragm stop setting member 13.

Parallel with the resistor 24 there lies the substitute resistor 27 which is connectible into the measurement circuit in place of the resistor 24 by means of the change-over switch 5. At the same time the supply lead to the slider 26 can be interrupted by the change-over switch 5. The change-over switch 5 is operable by the measurement key 1 which can also move the diaphragm setting member 17 and close the switch 4.

Figure 2:
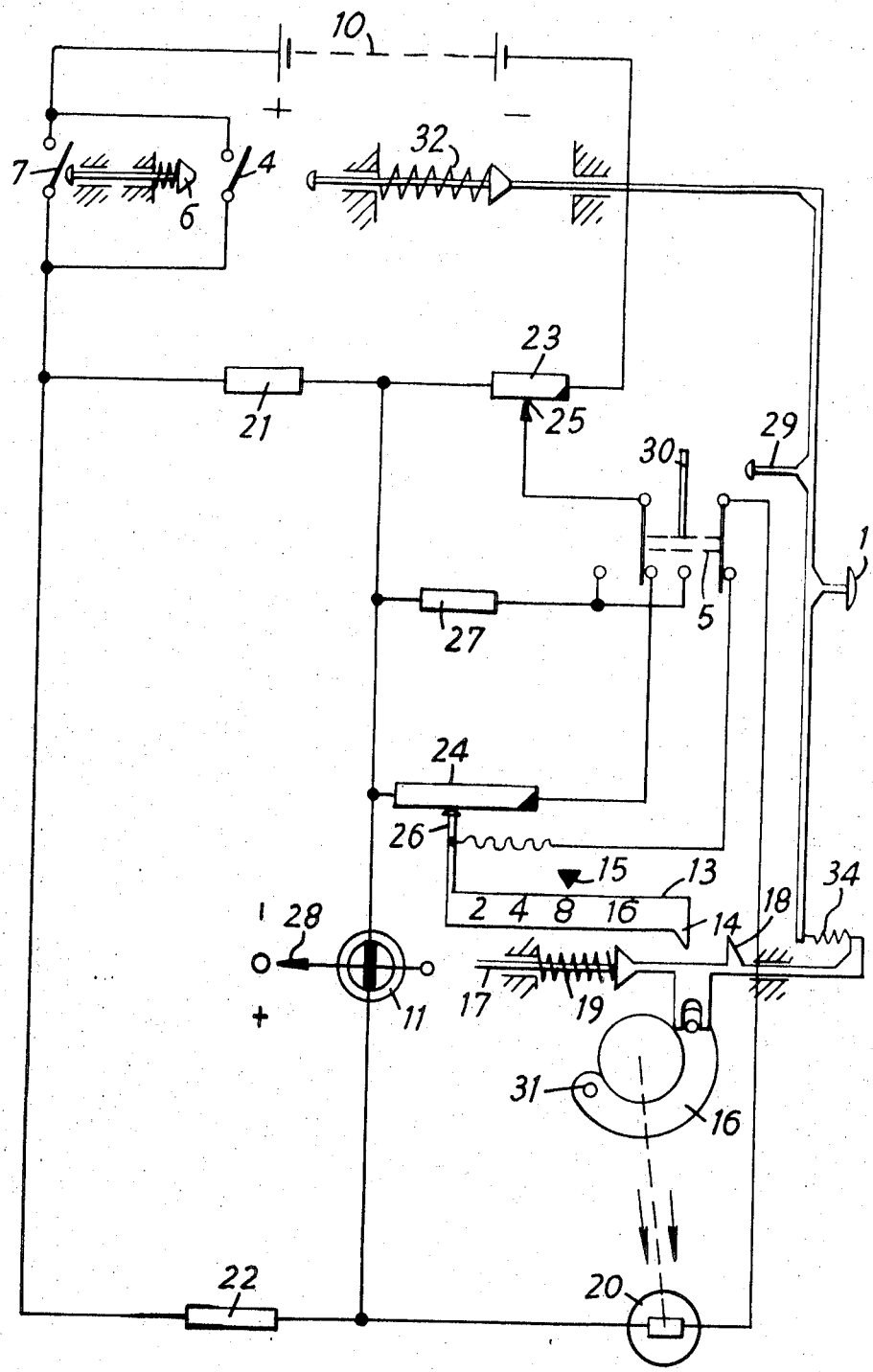
FIGS. 2 to 4 show the diagrammatic illustrations of the gear connections of the measurement keys with the exposure-measuring apparatus.

The manner of operation of the arrangement is as follows:

In the rest position the exposure-measuring apparatus assumes the position according to FIG. 2. In this position the resistor 24 is connected through the change-over switch 5 into the measurement circuit, so that the position of the diaphragm stop setting member 13 is taken into account in the brightness measurement by the position of the slider 26 over the resistor 24. The diaphragm blades 16 remain in their position completely clearing the lens opening 12.

If a measurement of brightness is to be carried out with the diaphragm blades 16 fully opened, the measurement key 6 should be depressed. Then the battery 10 is switched on through the switch 7. By movement of the slider 25 together with the time-setting member (not shown) the electric input of different exposure times is effected. In the setting of the diaphragm stop setting member 13 the slider 26 is moved until the pointer 28 of the galvanometer 11 points to the mark "0." In the case of this indication of the galvanometer 11 a coupling of time and diaphragm aperture is set which is correct for brightness. The diaphragm blades 16 close to the value pre-selected by the diaphragm stop setting member 13 on depression of the camera release 9. The closing movement of the diaphragm setting member 17 is limited by the stop 14 against which the stop nose 18 abuts.

Figure 3:
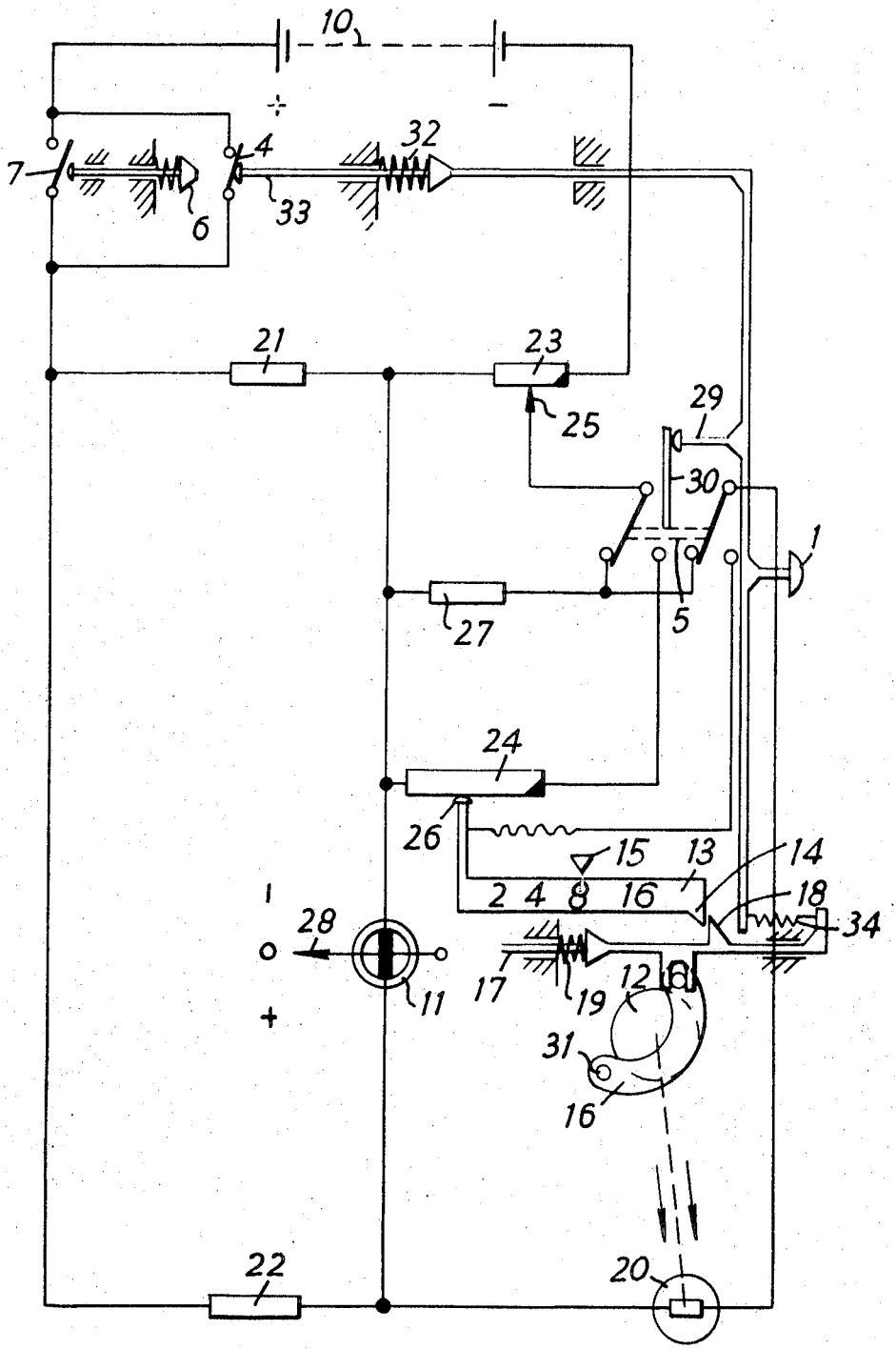
Figure 4:
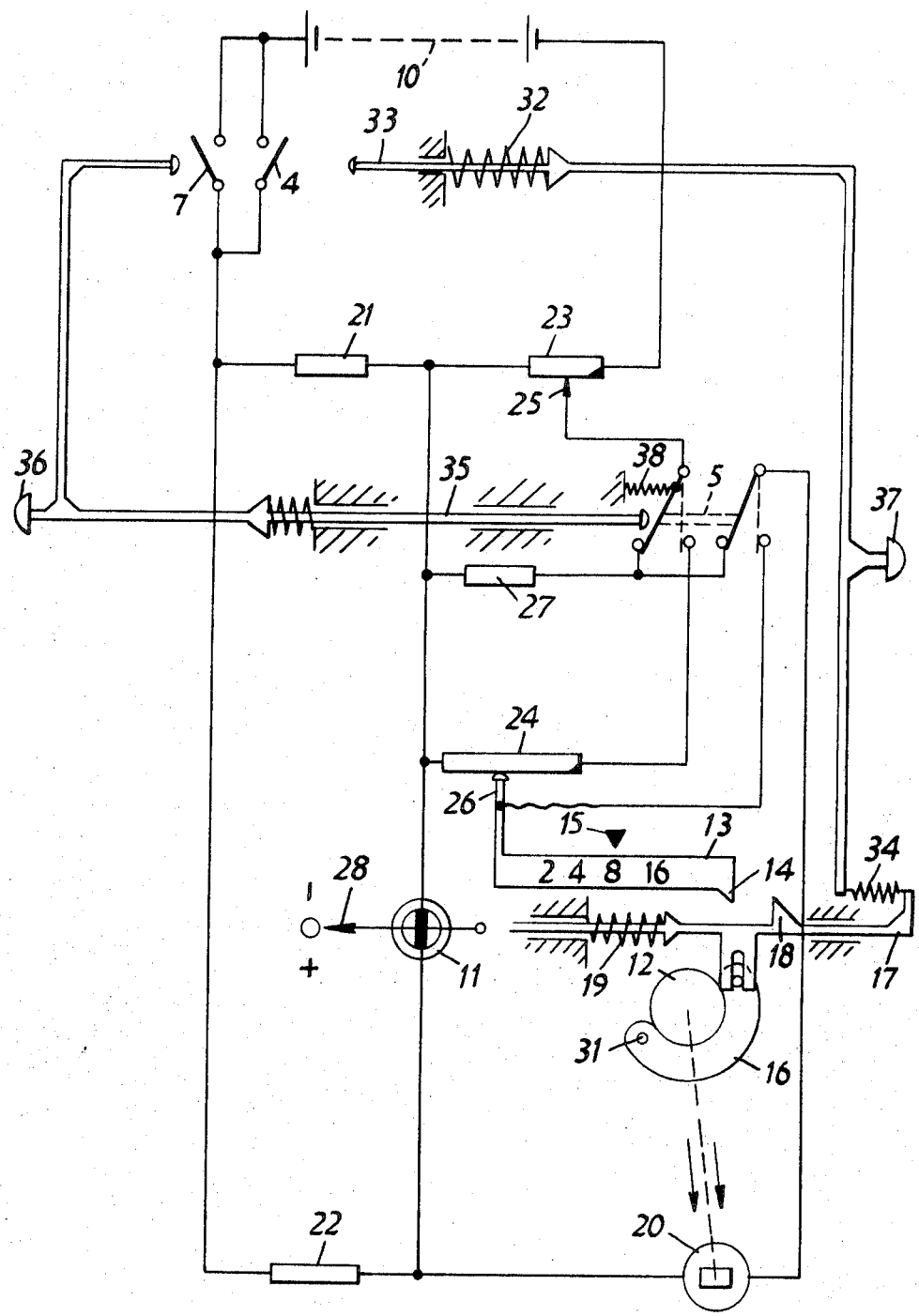

If a brightness measurement is to be carried out with the diaphragm blades 16 set to the pre-selected value, then the measurement key 1 is to be moved against the return spring 32 out of the position according to FIG. 2 into the position according to FIG. 3. In this case the arm 33 of the measurement key 1 closes the switch 4 of the measurement circuit. As a result of the drive member 29 the change-over switch 5 is actuated through the switch arm 30, the resistor 24 and the slider 26 being disconnected and instead the substitute resistor 27 being connected. Simultaneously with actuation of the measurement key 1, the diaphragm setting member 17 is entrained by means of the spring 34 until the stop nose 18 reaches the stop 14 of the diaphragm stop setting member 13. The diaphragm blades 16 diminish the lens opening 12 in accordance with the diaphragm stop value set against the mark 15. By movement of the slider 25 by means of a time-setting member the working voltage tapped on the resistor 23 can be varied and by adjustment of the diaphragm stop setting member 13 the effective opening of the diaphragm blades 16 for the photo-electric cell 20 can be varied. When the pointer 28 of the galvanometer 11 points to the mark "0," a setting of exposure time and diaphragm aperture is reached which corresponds to the prevailing subject brightness.

According to a further embodiment, on the housing of a monocular mirror reflex camera there are arranged the measurement key 37 for carrying out an exposure measurement with working aperture and the measurement key 36 for carrying out an exposure measurement with open aperture.

In the picture-taking lens 12 a pre-selector diaphragm is installed. The diaphragm stop setting member 13 possesses a stop 14 and is adjustable in relation to the setting mark 15. The diaphragm blades 16, mounted about non-displaceable pins 31, are geared with the diaphragm-setting member 17 which carries the stop nose 18. The return spring 19 seeks constantly to move the diaphragm-setting member 17 into the position corresponding to the open position of the diaphragm blades 16. Behind the diaphragm opening the photo-electric cell 20 is arranged in the ray path in the camera of the picture-taking lens 12.

The exposure-measuring apparatus is formed as bridge circuit, as regards its electrical part. The battery 10 delivers the feed voltage; the galvanometer 11 lies in the diagonal branch of the measurement bridge. The bridge resistors 21 and 22 are arranged in two mutually adjacent branches of the bridge. The resistors 23 and 24, connected in cascade as exponential voltage dividers, lie in the bridge branch adjacent to the photo-electric cell 20. The slider 25 of the resistor 23 is coupled with a time-setting member (not shown), while the slider 26 is geared with the diaphragm stop setting member 13.

Parallel with the resistor 24 there lies the substitute resistor 27 which can be connected into the measurement circuit by means of the change-over switch 5 of the resistor 24. At the same time the supply lead to the slider 26 can be interrupted by the change-over switch 5. The changeover switch 5 is operable by the switch arm 35 of the measurement key 36, which can also close the working switch 7.

The manner of operation of the arrangement is as follows:

In the rest position the exposure-measuring apparatus assumes the position as shown. In this position the substitute resistor 27 is connected into the measurement circuit through the change-over switch 5, so that the position of the diaphragm stop setting member 13 is not taken into account by the position of the slider 26 over the resistor 24 in the brightness measurement. The diaphragm blades 16 are in their position which completely clears the lens opening 12.

If a measurement of brightness is to be effected with the diaphragm blades 16 fully opened, the measurement key 36 is to be depressed. The battery 10 is then switched on through the working switch 7; at the same time through the switch arm 35 the change-over switch 5 is brought into the position shown in interrupted lines, against the return spring 38, in which position the variable resistor 24 is connected into the measurement circuit. By movement of the slider 25 together with the time-setting member (not shown) firstly the electric input of different exposure times takes place. On adjustment of the diaphragm stop setting member 13, then the slider 26 is moved until the pointer 28 of the galvanometer 11 points to the mark "0." In this indication of the galvanometer 11 a pairing of time and diaphragm stop appropriate for brightness is set. The diaphragm blades 16 close to the value pre-selected by the diaphragm stop setting member 13 on depression of the camera release. The closing movement of the diaphragm-setting member 17 is limited by the stop 14 against which the stop nose 18 abuts.

If a measurement of brightness is to be carried out with working aperture, then the measurement key 37 must be moved against the return spring 32. Then by means of the arm 33 of the measurement key 37 the working switch 4 of the measurement circuit is closed. Simultaneously with actuation of the measurement key 37, the diaphragm-setting member 17 is entrained by means of the spring 34 until the stop nose 18 reaches the stop 14 of the diaphragm stop setting member 13. The diaphragm blades 16 reduce the lens opening 12 according to the diaphragm stop value set against the mark 15. By movement of the slider 25 by means of the time-setting member the working voltage tapped on the resistor 23 can be varied and by setting of the diaphragm stop setting member 13 the effective aperture of the diaphragm blades 16 can be varied for the photo-electric cell 20. When the pointer 28 of the galvanometer 11 points to the mark "0," a setting of exposure time and diaphragm aperture corresponding to the prevailing subject brightness is achieved.

We claim:

1. In a photographic camera having a housing, a diaphragm aperture in the housing and a diaphragm aperture setting member positioned on the housing, the provision of an exposure measuring circuit including a photo-electric measuring device mounted on the housing in the path of light passing through the diaphragm aperture, a first resistor connected with the photo-electric measuring device and variable by adjustment of the diaphragm setting member, a second resistor connected with the photo-electric measuring device, a change over switch connected in circuit with the first and second resistors and the photo-electric measuring device and measuring key means positioned on the housing and adapted to select open or working aperture exposure measurement whereby with the change over switch in its first position for the purpose of open aperture measurement the first resistor is connected into the measuring circuit whereas with the change over switch in its second position for the purpose of working aperture measurement the second resistor is connected into the measuring circuit in place of the first resistor.

2. In a photographic camera according to claim 1 having a preselector diaphragm having diaphragm blades closeable to an aperture presettable by the diaphragm aperture setting member, the provision of spring means adapted to urge the diaphragm blades into the preset position when the measuring key means selects working aperture exposure measurement.

3. In a photographic camera according to claim 2 the provision of operating switch means connected in the measuring circuit and closeable to enable operation of the measuring circuit, measuring key means having first and second independantly operable keys positioned on the housing for selecting working aperture or open aperture measurement respectively, a first coupling means connected between the change over switch, the operating switch means and the spring means which first coupling means is moveable by the first key to effect change over of the change over switch from its first position to its second position, to effect closure of the operating switch means and movement of the diaphragm aperture to the value set by the diaphragm aperture setting member, a second coupling means connected between the second key and the operating switch means movable by the second key to effect closure of the operating switch means.

4. In a photographic camera according to claim 2 the provision of operating switch means connected in the measuring circuit and closeable to enable operation of the measuring circuit, measuring key means having first and second independantly operable keys positioned on the housing for selecting working aperture or open aperture measurement respectively, a first coupling means connected between the operating switch means and the spring means which first coupling means is moveable by the first key to effect closure of the operating switch means and movement of the diaphragm aperture to the value set by the diaphragm aperture setting member and a second coupling means connected between the second key, the change over switch and the operating switch means which second coupling means is moveable by the second key to effect closure of the operating switch means and change over of the change over switch from its second normal rest position to its first position.

5. In a photographic camera according to claim 4 the provision of a return spring coupled to the change over switch urging the switch into its second position and the second coupling means moves the change over switch against the action of the return spring into its first position when the second key is operated.

* * * * *